United States Patent
Shiao (10) Patent No.: US 9,648,923 B2
(45) Date of Patent: May 16, 2017

(54) MOLD AND METHOD FOR MAKING HETEROGENEOUS COMPOSITE OUTER SHOE SOLE

(71) Applicant: DAH LIH PUH CO., LTD., Taichung (TW)

(72) Inventor: Jui-Fen Shiao, Taichung (TW)

(73) Assignee: Dah Lih Puh Co., Ltd., Taichung (TW)

( * ) Notice: Subject to any disclaimer, the term of this patent is extended or adjusted under 35 U.S.C. 154(b) by 300 days.

(21) Appl. No.: 14/510,847

(22) Filed: Oct. 9, 2014

(65) Prior Publication Data

US 2016/0101583 A1    Apr. 14, 2016

(51) Int. Cl.
| | |
|---|---|
| B29D 35/14 | (2010.01) |
| A43B 13/12 | (2006.01) |
| A43B 13/32 | (2006.01) |
| A43D 8/06 | (2006.01) |
| A43D 25/18 | (2006.01) |
| A43D 8/04 | (2006.01) |

(52) U.S. Cl.
CPC ............... *A43B 13/12* (2013.01); *A43D 8/06* (2013.01); *A43D 25/18* (2013.01); *A43B 13/122* (2013.01); *A43B 13/32* (2013.01); *A43D 8/04* (2013.01); *B29D 35/142* (2013.01); *Y10T 156/1077* (2015.01); *Y10T 156/12* (2015.01); *Y10T 156/13* (2015.01); *Y10T 156/1744* (2015.01); *Y10T 156/1751* (2015.01); *Y10T 156/1798* (2015.01)

(58) Field of Classification Search
None
See application file for complete search history.

(56) References Cited

U.S. PATENT DOCUMENTS

| 2,080,994 A * | 5/1937 | Altvater | A43D 8/20 83/143 |
| 2,103,120 A * | 12/1937 | Sabo | A43D 8/34 12/16.6 |
| 4,984,320 A * | 1/1991 | Curley, Jr. | A43B 13/12 12/142 P |
| 7,698,912 B2 * | 4/2010 | Beruschi | A43D 8/06 69/21.5 |

FOREIGN PATENT DOCUMENTS

| EP | 0577307 A1 * | 1/1994 |
| WO | WO2010037039 * | 4/2010 |

* cited by examiner

*Primary Examiner* — Linda L Gray
(74) *Attorney, Agent, or Firm* — Wang Law Firm, Inc.

(57) ABSTRACT

A mold and a method for making a heterogeneous composite outer shoe sole. The mold includes a press cutting die, a positioning plate, a positioning jig and a pressing jig. The method involves using the press cutting die to cut a first base material into cut pieces, positioning the press cutting die on the positioning jig with the positioning plate held therebetween, using the pressing jig to push the cut pieces into the material receiving holes of the positioning plate; preparing a shoe sole preform that is made of a second base material and has binding portions positionally corresponding to the material receiving holes; applying adhesive to the binding portions and to the cut pieces; and butting the positioning plate with the shoe sole preform, whereby the cut pieces of the first base material are bound with the binding portions in a batch.

4 Claims, 12 Drawing Sheets

MOLD AND METHOD FOR MAKING HETEROGENEOUS COMPOSITE OUTER SHOE SOLE

BACKGROUND OF THE INVENTION

Technical Field

The present invention relates to manufacturing of outer shoe soles, and more particularly to a mold and a method for making a heterogeneous composite outer shoe sole.

Description of Related Art

A typical outer sole of a shoe is made using a piece of homogeneous base material and a simple shaping method as a unitary outer shoe sole. However, for making shoes that provide various functions, a composite sole consisting of two or more base materials has to be used instead of the foregoing unitary sole. As known, the manufacturing of such heterogeneous composite soles involves a more complicated process opposite to the simple shaping method used for making unitary soles. Presently, the process includes marking binding portions on a preform of a first material, cutting a second material into desired shapes, and adhering the second material to the binding portion of the first material. However, since all these steps require precision are currently performed manually, when the sole design is highly complex, the manual fabrication tends to cause human errors and in turn monetary loss.

BRIEF SUMMARY OF THE INVENTION

In view of the shortcomings of the prior art, the inventor of the present invention devises a mold and a method for making a heterogeneous composite outer shoe sole, which effectively prevent human errors during sole fabrication, and helps to simplify the manufacturing process, improve production and save manufacturing costs.

The mold for making a heterogeneous composite outer shoe sole comprises: a press cutting die, having a lower surface and an upper surface, the press cutting die comprising a plurality of cavities extending vertically from the lower surface toward but not reaching the upper surface, each said cavity being peripherally provided with a press knife projecting from the lower surface and being centrally formed with a through hole running from a bottom of the cavity to the upper surface, and the press cutting die further comprising a set of first positioning holes arranged at two diagonal corners thereof; a positioning plate, comprising a plurality of material receiving holes that are positionally corresponding to the cavities and are co-peripheral to the press knives; a positioning jig, comprising a depression for receiving the positioning plate, the depression containing a plurality of positioning cells that are positionally corresponding and co-peripheral to the material receiving holes, and the positioning jig comprising a set of positioning poles at corners thereof for being received in the first positioning holes; and a pressing jig, comprising a plurality of pressing sticks that are configured to pass through the through holes, each said pressing stick having a flat stick head so that when the pressing jig is placed on the press cutting die, the stick heads are level with edges of the press knives, and the pressing jig comprising a set of second positioning holes at corners thereof for receiving the positioning poles; in use, the press cutting die using the press knives to cut a plurality of cut pieces of a first base material that are shaped as the cavities, with the cut pieces of the first base material retained in the cavities of the press cutting die, then the press cutting die carrying the cut pieces of the first base material being placed on the positioning jig with the positioning poles received in the first positioning holes and with the positioning plate received in the depression, the pressing jig placed on the press cutting die using the pressing sticks to push the cut pieces of the first base material from the cavities of the press cutting die into the material receiving holes of the positioning plate, adhesive being applied to the cut pieces of the first base material and to a shoe sole preform made of a second material, and butting the positioning plate having the cut pieces with the shoe sole preform so as to make the heterogeneous composite outer shoe sole more efficiently with less risk of human errors.

Therein, the first base material has a thickness smaller than or equal to a thickness of the cavity of the press cutting die.

Therein, a combined thickness of the material receiving hole of the positioning plate and the positioning cell of the positioning jig is at least equal to a thickness of the cavity.

Therein, the positioning pole has a length that is at least equal to a combined length of the first positioning hole and the second positioning hole.

A method for making a heterogeneous composite outer shoe sole comprises the following steps: using the press cutting die to press cut a first base material into cut pieces, positioning the press cutting die on the positioning jig with the positioning plate held therebetween, placing the pressing jig on the press cutting die and using the pressing sticks to push the cut pieces from the cavities into the material receiving holes of the positioning plate; preparing a shoe sole preform that is made of a second base material and has binding portions positionally corresponding to the material receiving holes; applying adhesive to the binding portions of the preform and to the cut pieces of the first base material; butting the positioning plate with the shoe sole preform, so that the cut pieces of the first base material are aligned with and bound to the binding portions, whereby the cut pieces of the first base material are bound with the binding portions in a batch.

The present invention has the advantages that the press cutting die, the positioning plate and the positioning jig are corresponding, so the heterogeneous composite outer shoe sole can be made with improved precision. As human errors can be eliminated, the productivity can be increased and the manufacturing costs can be reduced.

DETAILED DESCRIPTION OF THE INVENTION

Figure 1:
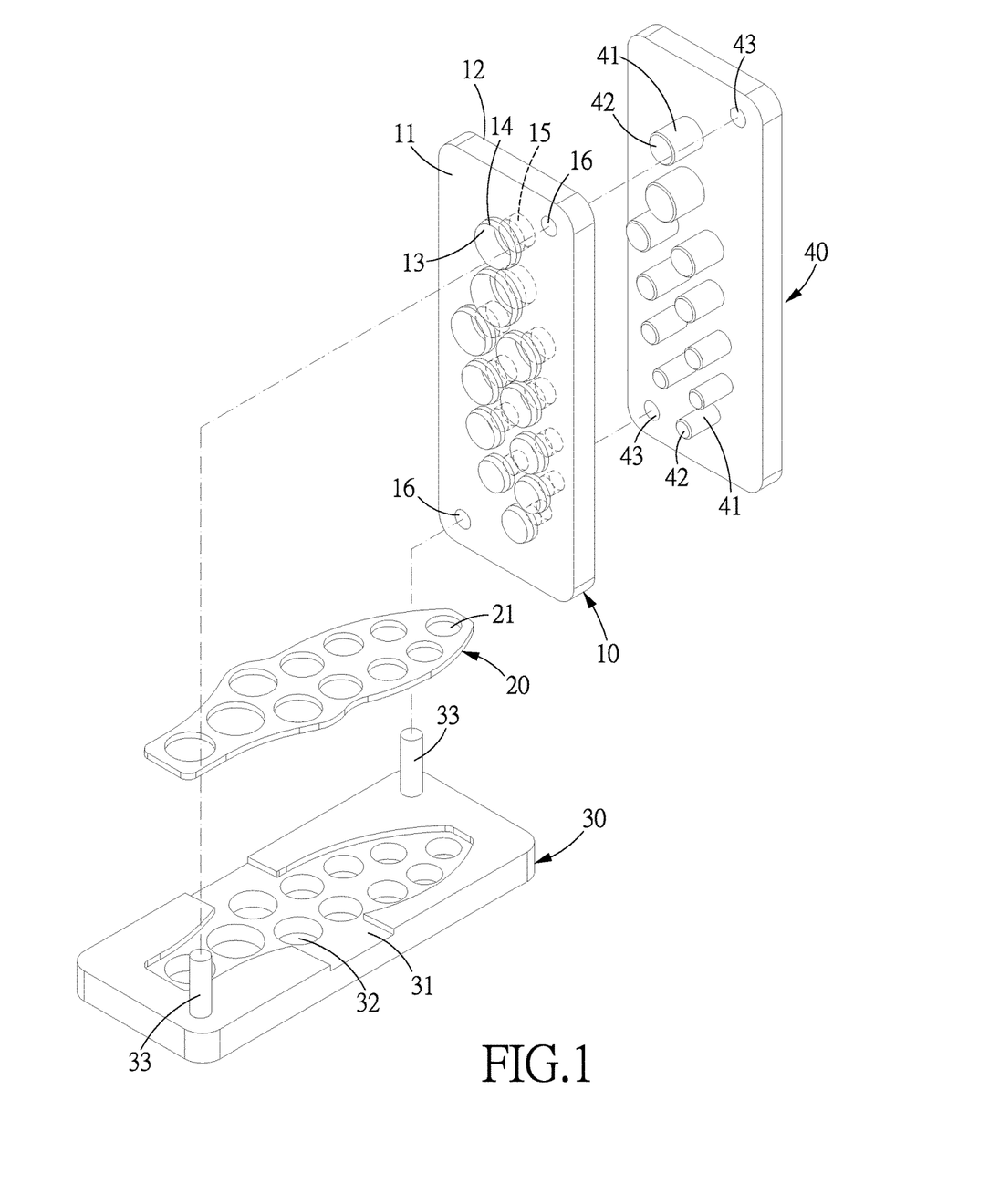
FIG. 1 is a perspective view of a mold for making a heterogeneous composite outer shoe sole according to the present invention.

Referring to FIG. 1, according to the present invention, a mold for making a heterogeneous composite outer shoe sole comprises a press cutting die 10, a positioning plate 20, a positioning jig 30 and a pressing jig 40.

The press cutting die 10 has a lower surface 11 and an upper surface 12. The press cutting die 10 comprises a plurality of cavities 13 extending vertically from the lower surface 11 toward but not reaching the upper surface 12. Each said cavity 13 is peripherally provided with a press knife 14 projecting from the lower surface 11 and is centrally formed with a through hole 15 running from a bottom of the cavity 13 to the upper surface 12. The press cutting die 10 further comprises a pair of first positioning holes 16 arranged at two diagonal corners of the press cutting die 10.

The positioning plate 20 has a plurality of material receiving holes 21 corresponding to the cavities 13 and co-peripheral to the press knives 14.

The positioning jig 30 includes a depressions 31 shaped to receive the positioning plate 20. In the depression 31, there are positioning cells 32 positionally corresponding and co-peripheral to the material receiving holes 21. At corners of the positioning jig 30, there are positioning poles 33 configured to be received in the first positioning holes 16.

The pressing jig 40 has a plurality of pressing sticks 41 configured to pass through the through hole 15. Each said pressing stick 41 has a flat stick head 42. When the pressing jig 40 is placed on the press cutting die 10, the stick head 42 is level with the edge of the corresponding press knife 14. At corners of the pressing jig 40, there are also second positioning holes 43 configured to receive the positioning poles 33.

Figure 2:
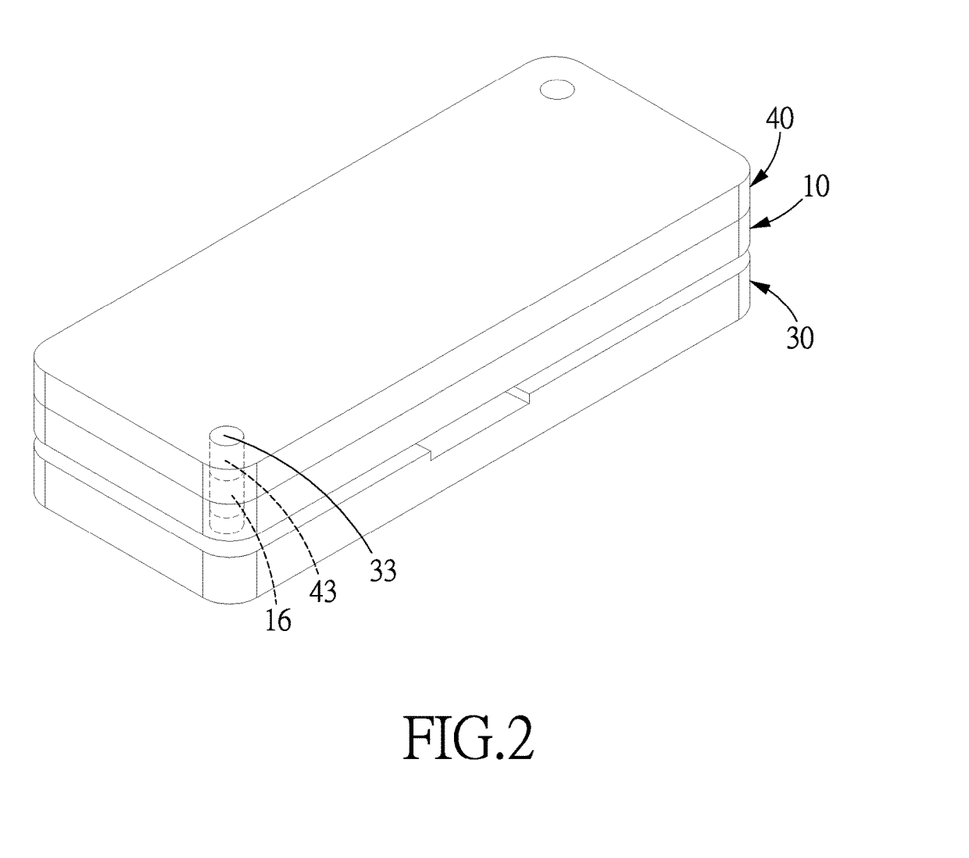
FIG. 2 is a perspective view of the mold of FIG. 1 assembled.

FIG. 2 is a perspective view of the mold of FIG. 1 assembled. When all of the foregoing components are assembled, the pressing jig 40 is placed on the press cutting die 10, and the positioning poles 33 of the positioning jig 30 pass through the first positioning holes 16 and the second positioning holes 43.

Figure 3:
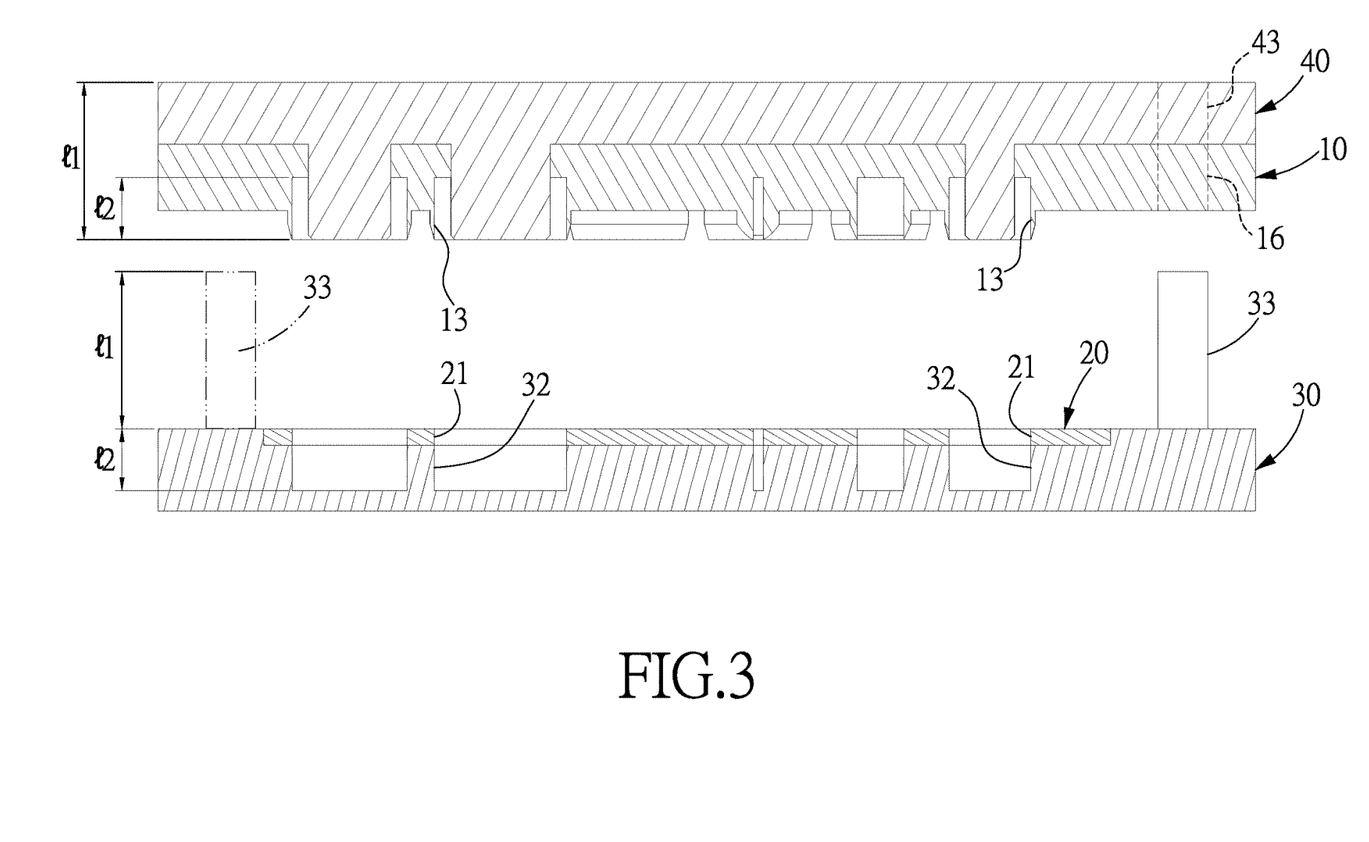
FIG. 3 and FIG. 4 are cross-sectional views of the mold according to the present invention.

FIG. 3 is a cross-sectional view of the mold, wherein the pressing jig 40 and the press cutting die 10 are combined and the positioning plate 20 is placed on the positioning jig 30. As shown, the positioning pole 33 has a length $\ell 1$ that is at least equal to the combined length $\ell 1$ of the first positioning hole 16 and the second positioning hole 43. The combined length $\ell 2$ of the material receiving hole 21 of the positioning plate 20 and the positioning cell 32 of the positioning jig 30 is at least equal to the length $\ell 2$ of the cavity 13.

Figure 4:
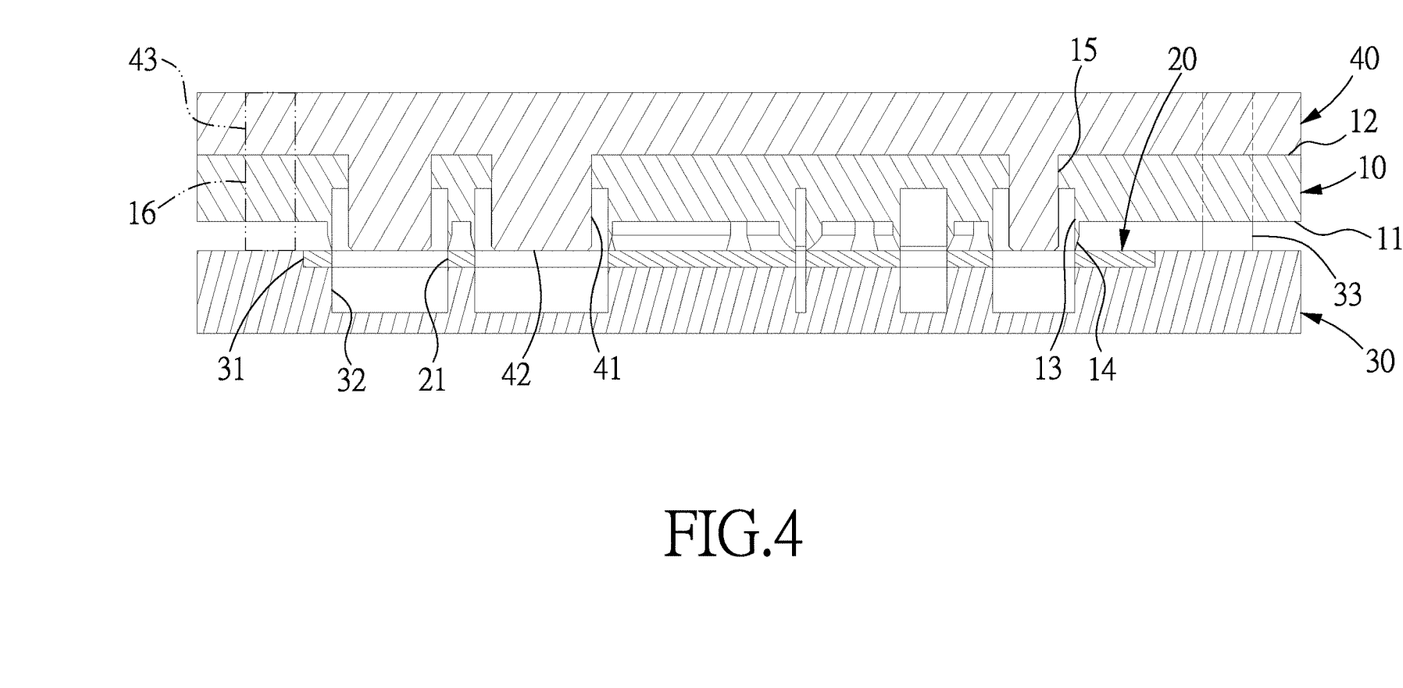

As shown in FIG. 4, when the mold of the present invention is assembled, the positioning jig 30 is the bottommost, and the positioning plate 20 is placed in the depression 31, so that the material receiving holes 21 are aligned with the positioning cells 32. The press cutting die 10 has its lower surface 11 facing the positioning jig 30, and has its upper surface 12 contacting the pressing jig 40. With the positioning poles 33 passing through the first positioning holes 16 and the second positioning holes 43, the press cutting die 10 and the pressing jig 40 are positioned with respect to the positioning jig 30. At this time, the pressing sticks 41 of the pressing jig 40 pass through the through holes 15 and enter the cavities 13, such that the stick heads 42 of the pressing sticks 41 are level with edges of the press knives 14.

Figure 5:
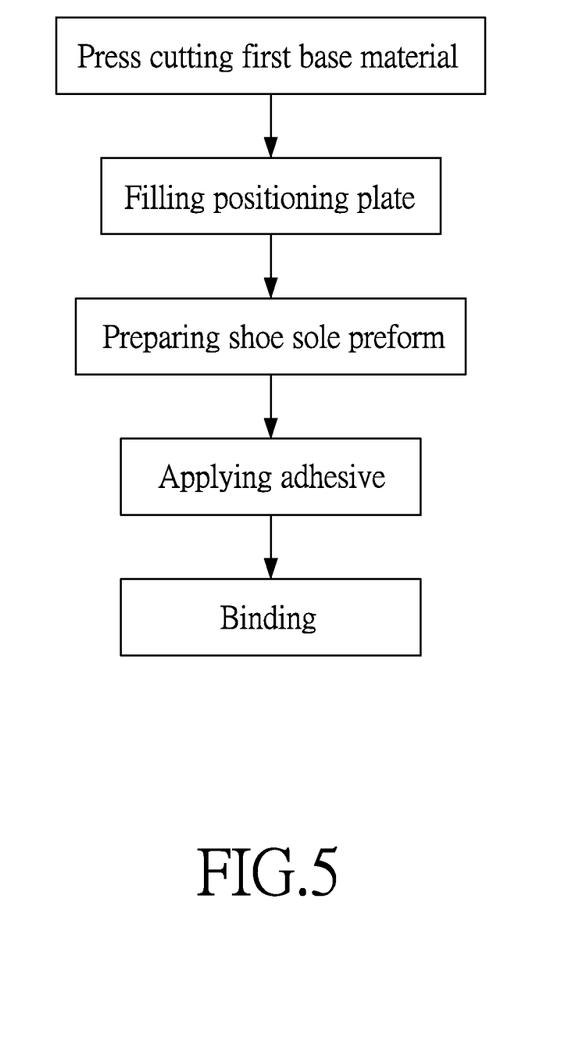
FIG. 5 is a flowchart of a method for making a heterogeneous composite outer shoe sole according to the present invention.

FIG. 5 is a flowchart of a method for making a heterogeneous composite outer shoe sole according to the present invention. The method comprises the following steps in sequence: press cutting a first base material, filling the positioning plate, preparing a sole preform, applying adhesive, and binding.

Figure 6:
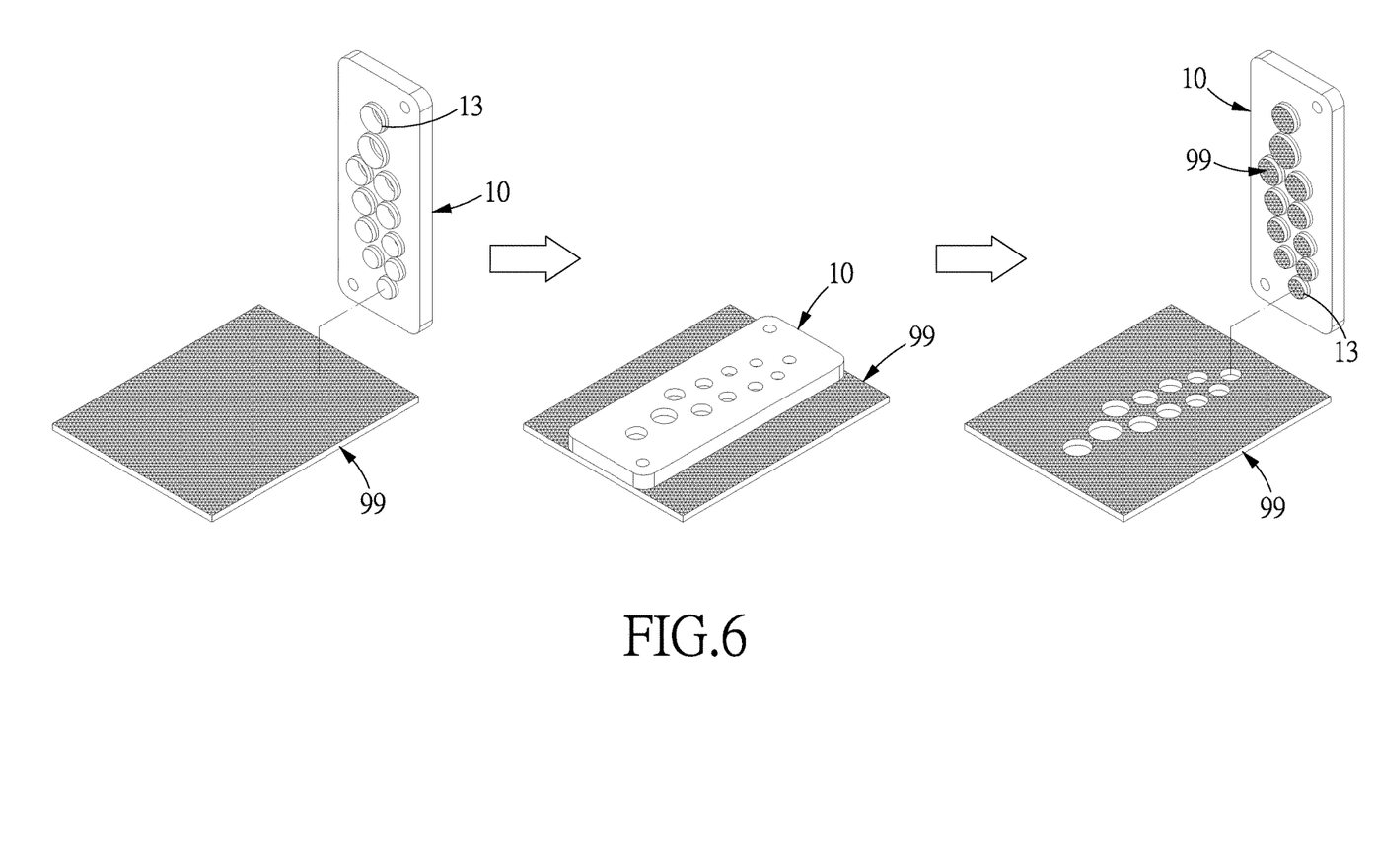
FIG. 6 is a schematic drawing illustrating the step of press cutting a first base material as recited in FIG. 5.

FIG. 6 graphically illustrates the step of press cutting a first base material. The press cutting die 10 is placed on a sheet of a first base material 99 to be cut with its surface having the cavities 13 facing the first base material 99. After the press cutting operation, the cut pieced of the first base material 99 remain in the cavities 13.

Figure 7:
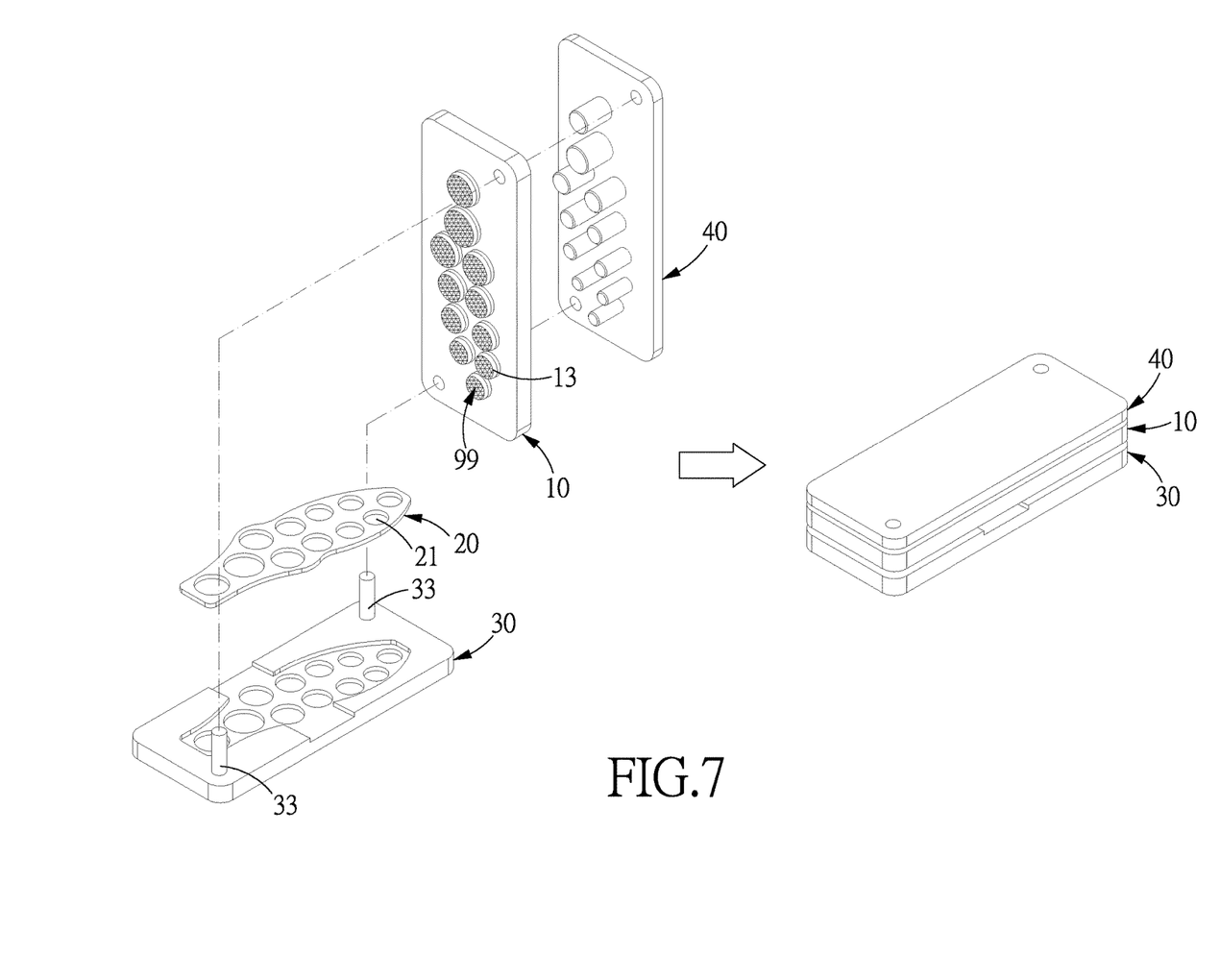
FIG. 7 is a schematic drawing illustrating the step of filling a positioning plate as recited in FIG. 5.

FIG. 7 graphically illustrates the step of filling the positioning plate. The positioning plate 20 is placed on the positioning jig 30, and the press cutting die 10 is placed on the positioning plate 20 with the positioning poles 33 well positioned, so that the cavities 13 are aligned with the material receiving holes 21. Then the pressing jig 40 is placed on the press cutting die 10, so that the pressing jig 40 pushes the cut pieces of the first base material 99 from the cavities 13 onto the positioning plate 20.

Figure 8:
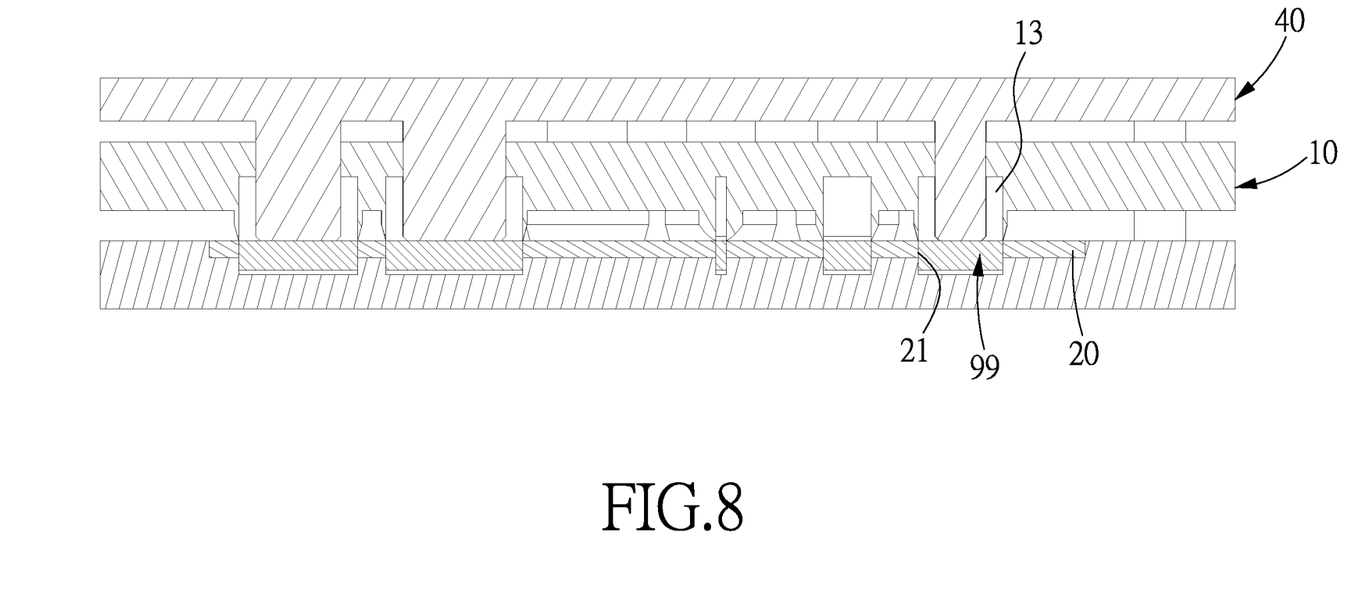
FIG. 8 is a cross-sectional view of the mold of FIG. 1 showing the positioning jig filled according to FIG. 7.

FIG. 8 is a cross-sectional view of the mold at the step of filling the positioning plate. The pressing jig 40 uses the pressing sticks 41 to push the cut pieces of the first base material 99 from the cavities 13 of the press cutting die 10 into the material receiving holes 21 of the positioning plate 20.

Figure 9:
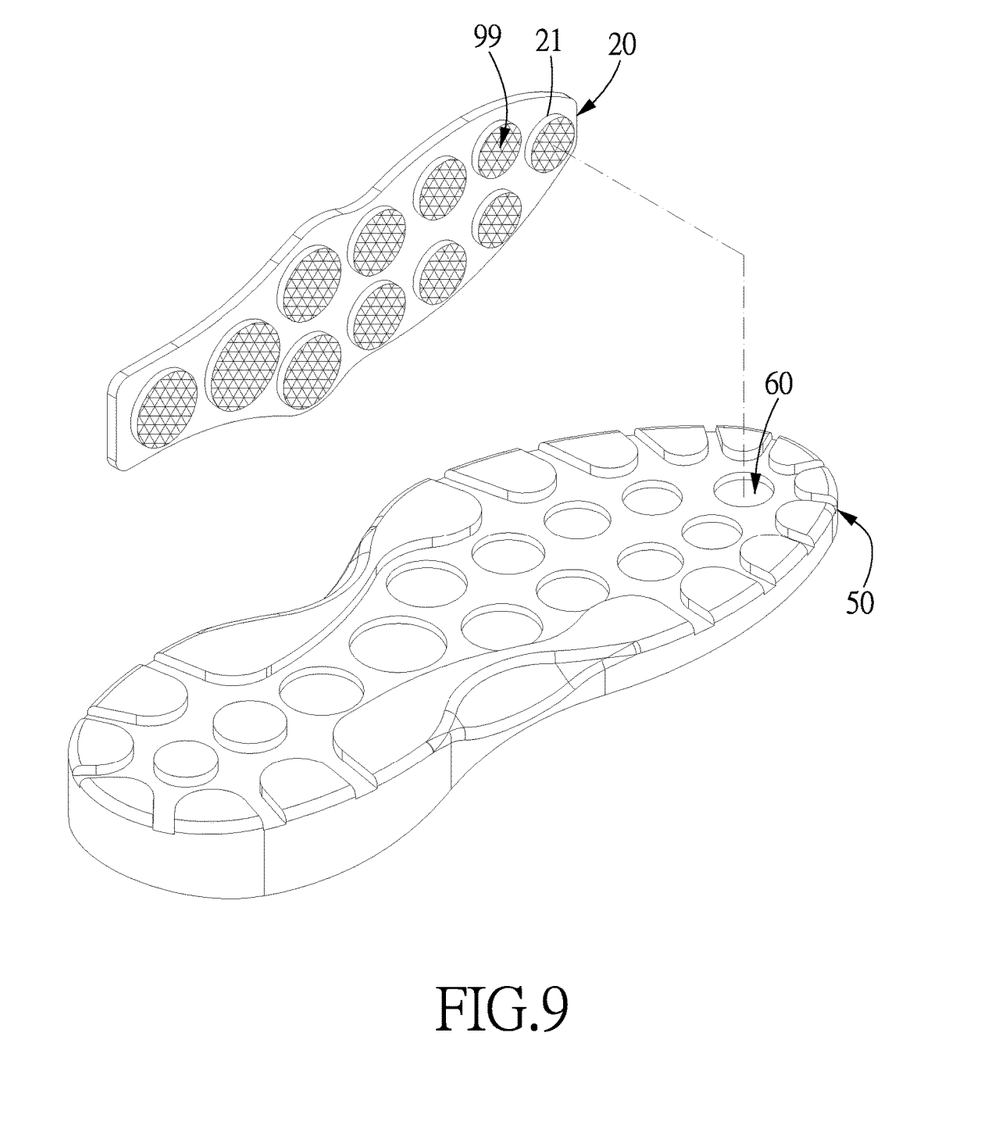
FIG. 9 is a perspective view of a sole preform according to the present invention.

FIG. 9 graphically illustrates the step of preparing a sole preform. A prepared preform of a shoe sole 50 made of a second material is provided with at least one binding portion 60 corresponding to the material receiving hole 21 of the positioning plate 20, so that the cut pieces of the first base material 99 retained on the positioning jig 20 can be easily aligned with the binding portion 60 of the shoe sole preform 50.

Figure 10:
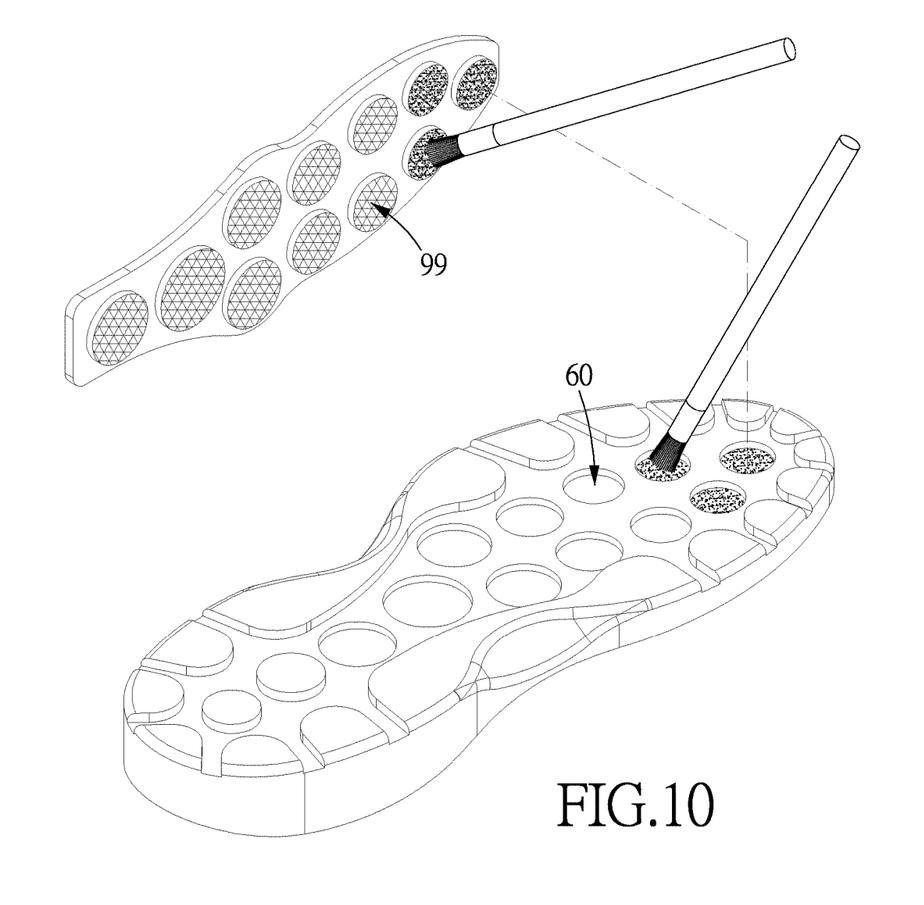
FIG. 10 is a schematic drawing illustrating applying adhesive according to the method of the present invention.

FIG. 10 graphically illustrates the step of applying adhesive. As shown, adhesive is applied to both of the binding portion(s) 60 and the cut piece(s) of the first base material 99.

Figure 11A:
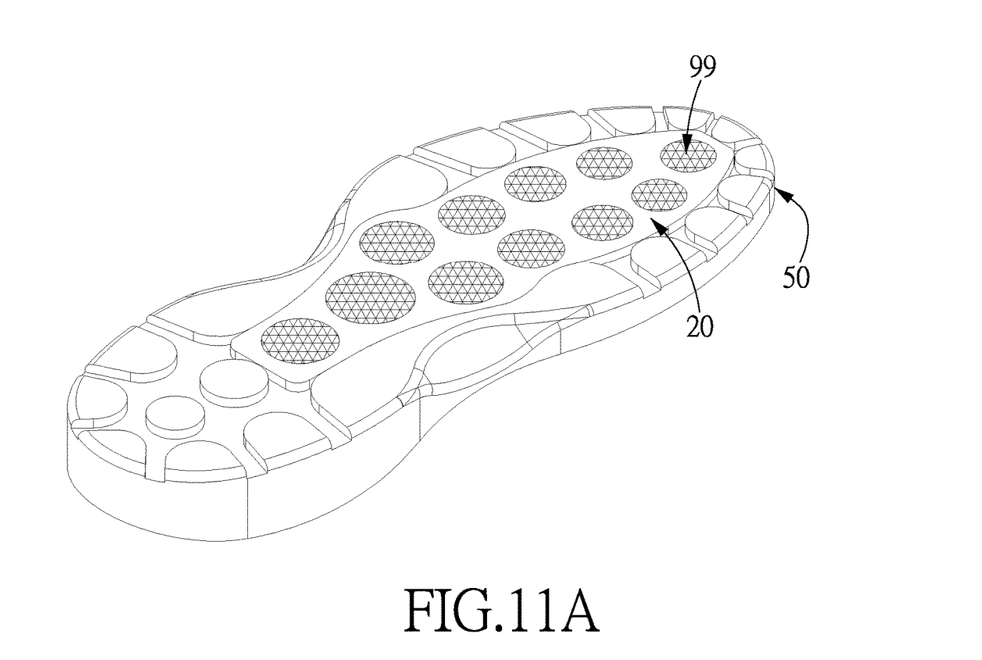
FIG. 11A and FIG. 11B are schematic drawings illustrating binding according to the method of the present invention.
Figure 11B:
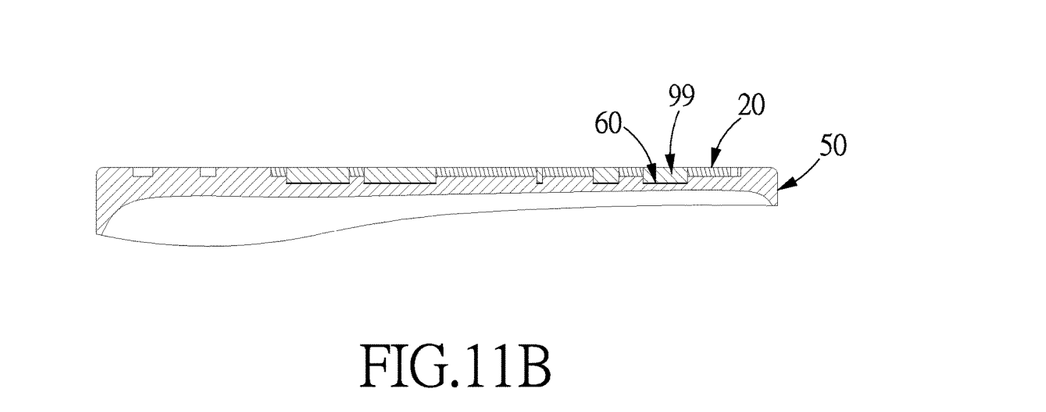

The shoe sole preform 50 bound with the first base material 99 is depicted in FIGS. 11A and B. The binding process can be easily achieved by butting the positioning plate 20 carrying the first base material 99 with the shoe sole preform 50 with the first base material 99 aligned with the binding portions 60 since both of the binding portions 60 and the first base materials 99 have been applied with adhesive.

Figure 12:
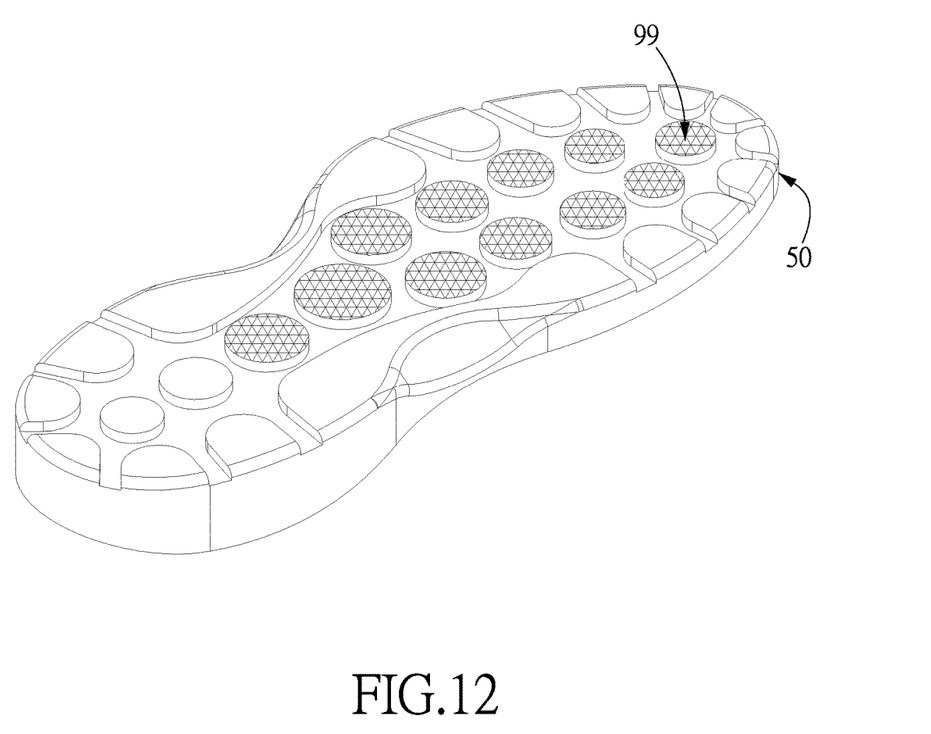
FIG. 12 is a perspective view of a shoe sole made according to the present invention.

FIG. 12 is a perspective view of the finished heterogeneous composite outer shoe sole according to the present invention. As shown, the cut pieces of the first base material 99 are well positioned on and attached to on shoe sole preform 50.

What is claimed is:

1. A mold for making a heterogeneous composite outer shoe sole, the mold comprising:
    a press cutting die, having a lower surface and an upper surface, the press cutting die comprising a plurality of cavities extending vertically from the lower surface toward but not reaching the upper surface, each said cavity being peripherally provided with a press knife projecting from the lower surface and being centrally formed with a through hole running from a bottom of the cavity to the upper surface, and the press cutting die further comprising a set of first positioning holes arranged at two diagonal corners thereof;
a positioning plate, comprising a plurality of material receiving holes that are positionally corresponding to the cavities and are co-peripheral to the press knives;
a positioning jig, comprising a depression for receiving the positioning plate, the depression containing a plurality of positioning cells that are positionally corresponding and co-peripheral to the material receiving holes, and the positioning jig comprising a set of positioning poles at corners thereof for being received in the first positioning holes; and
a pressing jig, comprising a plurality of pressing sticks that are configured to pass through the through holes, each said pressing stick having a flat stick head so that when the pressing jig is placed on the press cutting die, the stick heads are level with edges of the press knives, and the pressing jig comprising a set of second positioning holes at corners thereof for receiving the positioning poles;
in use, the press cutting die using the press knives to cut a plurality of cut pieces of a first base material that are shaped as the cavities, with the cut pieces of the first base material retained in the cavities of the press cutting die, then the press cutting die carrying the cut pieces of the first base material being placed on the positioning jig with the positioning poles received in the first positioning holes and with the positioning plate received in the depression, the pressing jig placed on the press cutting die using the pressing sticks to push the cut pieces of the first base material from the cavities of the press cutting die into the material receiving holes of the positioning plate, adhesive being applied to the cut pieces of the first base material and to a shoe sole preform made of a second material, and butting the positioning plate having the cut pieces with the shoe sole preform so as to make the heterogeneous composite outer shoe sole.

2. The mold of claim 1, wherein the first base material has a thickness smaller than or equal to a thickness of the cavity of the press cutting die.

3. The mold of claim 1, wherein a combined thickness of the material receiving hole of the positioning plate and the positioning cell of the positioning jig is at least equal to a thickness of the cavity.

4. The mold of claim 1, wherein the positioning pole has a length that is at least equal to a combined length of the first positioning hole and the second positioning hole.

* * * * *